United States Patent [19]
Reiling, Jr.

[11] Patent Number: 5,683,646
[45] Date of Patent: Nov. 4, 1997

[54] FABRICATION OF LARGE HOLLOW COMPOSITE STRUCTURE WITH PRECISELY DEFINED OUTER SURFACE

[75] Inventor: Henry E. Reiling, Jr., San Diego, Calif.

[73] Assignee: McDonnell Douglas Corporation, Huntington Beach, Calif.

[21] Appl. No.: 438,998

[22] Filed: May 10, 1995

[51] Int. Cl.$^6$ .................................................. B29C 70/28
[52] U.S. Cl. .......................... 264/512; 264/225; 264/313; 264/510; 425/175; 425/388; 425/390
[58] Field of Search .......................... 264/510, 511, 264/512, 516, 257, 258, 313, 314, 219, 220, 225, 227, 226; 156/245, 285; 425/175, 388, 389, 390

[56] References Cited

U.S. PATENT DOCUMENTS

| | | |
|---|---|---|
| 779,979 | 1/1905 | Walter .................... 264/220 |
| 2,838,435 | 6/1958 | Hewett ..................... 264/314 |
| 3,292,544 | 12/1966 | Caldwell et al. . |
| 3,453,620 | 7/1969 | Fleming et al. . |
| 3,616,140 | 10/1971 | Copeland et al. . |
| 3,773,879 | 11/1973 | Munsil et al. ............. 264/510 |
| 3,913,108 | 10/1975 | Branen . |
| 3,962,393 | 6/1976 | Blad . |
| 4,067,950 | 1/1978 | Baruschke . |
| 4,396,569 | 8/1983 | Reikowski ................ 264/227 |
| 4,536,364 | 8/1985 | Lindskog .................. 264/227 |
| 4,620,890 | 11/1986 | Myers et al. . |
| 4,780,262 | 10/1988 | Von Volkli . |
| 4,842,670 | 6/1989 | Callis et al. ............... 156/285 |
| 5,015,168 | 5/1991 | Boime et al. . |
| 5,134,002 | 7/1992 | Vallier . |
| 5,152,949 | 10/1992 | Leoni et al. . |
| 5,217,669 | 6/1993 | Dublinski et al. . |
| 5,286,438 | 2/1994 | Dublinski et al. ......... 264/225 |

*Primary Examiner*—Catherine Timm
*Attorney, Agent, or Firm*—Bell, Seltzer, Park & Gibson, P.A.

[57] ABSTRACT

A method for fabricating a composite structure such as an aircraft radome includes preparing seamless female support mold/caul plate tooling, and seamless male support mold/vacuum bag tooling. An uncured composite structure is collated on the external surface of the male support mold/vacuum bag tooling, and then transferred to the female support mold/caul plate tooling for curing. The female support mold/caul plate tooling defines the outer surface of the final composite structure, permitting the outer surface of be smooth and of an aerodynamic shape.

15 Claims, 7 Drawing Sheets

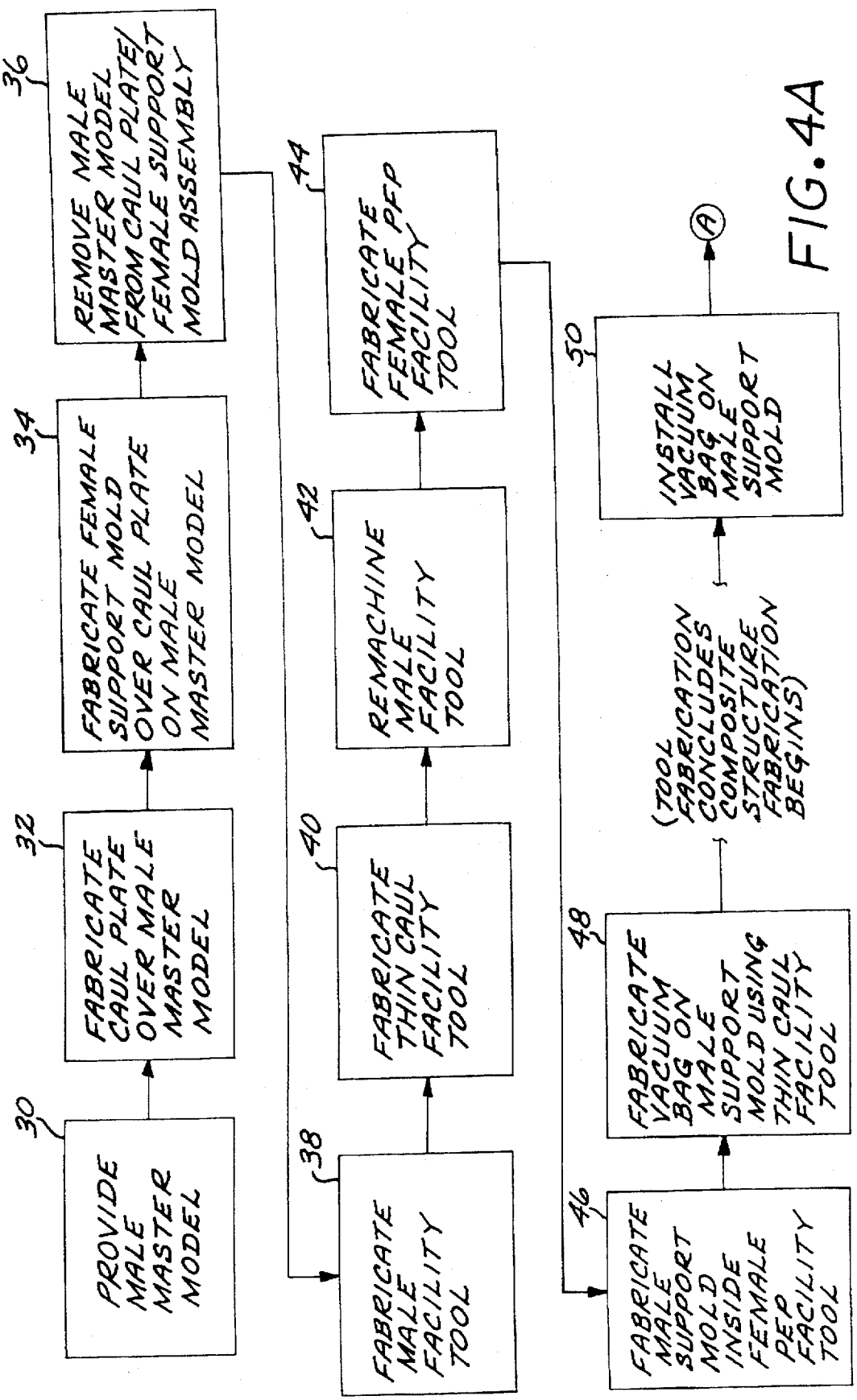

FABRICATION OF LARGE HOLLOW COMPOSITE STRUCTURE WITH PRECISELY DEFINED OUTER SURFACE

BACKGROUND OF THE INVENTION

This invention relates to composite materials, and, more particularly, to the fabrication of large, precision structures from such composite materials.

Composite materials are a class of materials finding widespread use in aerospace and other structural applications. These materials can be tailored to have specific properties such as high strength-to-weight or high modulus-to-weight ratios, and with the optimal properties oriented in selectable directions. For aerospace applications, a class of composite materials is fabricated from light-weight, nonmetallic materials. These nonmetallic composite materials are made of constituents including fibers such as glass or kevlar, matrix materials such as epoxies or polyamides, and foams such as syntactic foams.

Besides having good mechanical properties, such nonmetallic composite materials are also transparent to electromagnetic radiation such as radar waves, and can therefore be used in the construction of aircraft radomes. One type of radome is an external structural member of an aircraft which covers and protects a radar transceiving antenna located within the aircraft. The radar waves transmitted and received by the antenna pass through the radome, preferably without significant distortion of the signals. The radome is also part of the structural skin of the aircraft, and must withstand aerodynamic and aerothermal loadings. As an example, the nose section of many fighter-type aircraft is a radome structure. Radomes are also found at other locations on various types of aircraft, such as in the tails, under the fuselages, and on the wings.

The properties of the composite materials can be tailored to and optimized for specific applications, in part because they can be fabricated by a custom lay-up procedure. That is, the required materials properties and the arrangement of the constituents needed to achieve those properties are first determined by engineering analysis. Plies of uncured "prepreg" material are placed into a mold, together with foam layers in some cases, as determined by the engineering calculations. This uncured composite is normally heated under pressure to cure the matrix materials and foams, thereby forming a solid structural member.

While this approach has been proved to be highly effective, there remain obstacles in the preparation of some technologically important structures, such as some types of radomes. Some radomes, such as those forming the noses of fighter aircraft, can be quite long and relatively narrow. For example, the F-15 nose radome is of a generally conical or ogival shape with a length of about 9 feet and a base diameter of about 3 feet. The outside surface of the radome must be very precisely positioned, unwrinkled, and aerodynamically smooth. The thickness requirements of the radome coupled with its outside surface requirements define the location of the inside surface, which must be unwrinkled and smooth. The radome is essentially symmetrical about the conical or ogival axis.

Current F-15 nose radomes utilize a glass fiber and resin matrix composite material system which is fabricated using a filament winding procedure. After curing, the composite structure is conventionally machined to provide the desired outside and inside surfaces of the radome. A proposed enhanced capability F-15 nose radome which utilizes foam layers in addition to the basic fiber and resin matrix composite material system does not lend itself to the filament winding and subsequent machining utilized in manufacturing the current F-15 nose radomes. Initial efforts to fabricate such a radome in a segmented female mold, while somewhat successful, are not conducive to the use of some design features.

In another approach that has been proposed for radomes generally but has not been applied for a radome such as the enhanced capability F-15 nose radome, U.S. Pat. No. 4,780,262 discloses the use of a male central mold and a segmented female external mold. This approach has several drawbacks. The segmented details are sources of potential leaks in a vacuum bag procedure as well as excessive tool markoff from the joints of the segments. It is labor intensive in the assembly, disassembly, and cleaning of the mating surfaces of the various segments of the female tool.

There is therefore a need for an improved approach to the fabrication of such enhanced capability radomes. The present invention fulfills this need, and further provides related advantages.

SUMMARY OF THE INVENTION

The present invention provides an approach to fabricating large, hollow composite structures that require a precisely positioned, smooth outer surface, precise thickness control so as to define a smooth inner surface, and an absence of splices, mold parting lines, and other interruptions of the symmetry and uniformity of the part. The approach is particularly useful for radomes and other large structures which are relatively long and narrow, such as, for example, engine nacelles and tail cones. The present process permits the use of fiber/matrix and foam materials to build structures.

In accordance with the invention, a method for fabricating a composite structure having an outer surface and an inner surface comprises the steps of preparing tooling and thereafter fabricating the composite structure using the tooling. The first element of tooling, a caul plate/female support mold assembly, is prepared by the steps of providing a male master model having an exterior surface that defines the outer surface of the finished composite structure, fabricating a caul plate over the exterior surface of the male master model (with the caul plate having an interior surface contacting and matching the exterior surface of the male master model), fabricating a female support mold over the caul plate (with the female support mold having an interior surface contacting an exterior surface of the caul plate), and removing the male master model. The second element of tooling, a male support mold/vacuum bag assembly is prepared, preferably by one of the two approaches described subsequently. The male support mold/vacuum bag assembly has an exterior surface defining an inner surface of an uncured composite layup. The composite structure is prepared by causing the vacuum bag to adhere to the surface of the male support mold, collating an uncured composite layup overlying the vacuum bag, placing the caul plate overlying the uncured composite layup, placing the female support mold overlying the caul plate, causing the vacuum bag, uncured composite layup, and caul plate to adhere to the female support mold, causing the vacuum bag and uncured composite layup to de-adhere from the male support mold, and curing the uncured composite layup in contact with the caul plate with an external pressure applied to the composite layup through the vacuum bag. The composite structure may be post-cured as desired after removal from the tooling.

In a most preferred approach for preparing the male support mold/vacuum bag assembly, a male facility tool is fabricated having an exterior surface matching the inner surface of the uncured composite layup, and a thin caul facility tool is fabricated overlying the exterior surface of the male facility tool. The exterior surface of the male facility tool is remachined so that the machined exterior surface of the male facility tool matches the interior surface of the vacuum bag. A female facility tool is fabricated over the remachined exterior surface of the male facility tool, and the male support mold is fabricated having its exterior surface matching the interior surface of the female facility tool. The vacuum bag is fabricated over the exterior surface of the male support mold and has an exterior surface matching the interior surface of the thin caul facility tool.

In another approach to preparing the male support mold/vacuum bag assembly, a dummy composite structure with a shape and thickness that approximates the uncured composite layup is formed inside the caul plate/female support mold assembly. An exterior surface of the vacuum bag is placed in contact with the interior surface of the dummy composite structure and the female support mold. The male support mold is fabricated in contact with the interior surface of the vacuum bag, the male support mold and the vacuum bag together comprising the male support mold/vacuum bag assembly. The male support mold/vacuum bag assembly and dummy composite structure are removed from the inside of the caul plate/female support mold assembly, and the dummy composite structure is removed from the male support mold/vacuum bag assembly. Preferably in all cases, adherence to the male support mold and the female support mold is attained by the application of a vacuum The approach of the present invention provides complete access to the surfaces of the uncured composite structure during the collation (layup) procedures. The caul plate, which is light in weight and provides the required outer surface of the composite structure, is easily installed over the collated, uncured composite layup and provides a physical barrier to prevent damage to the uncured composite structure during installation of the female support mold that provides the required rigidity to the caul plate during the cure cycle. The one-piece caul plate and the one-piece female support mold eliminate potential leaks in the tooling during the cure cycle, as well as providing a smooth, aerodynamic surface free from tool markoff, as is the case for a segmented female support mold. The use of one-piece tooling also reduces assembly, disassembly, and tool preparation time, and avoids the possibility of errors in the assembly of the tooling. The cured composite structure is easily removed from the female support mold and the caul plate.

In the present approach, each element of the composite structure and related tooling is added to the outside of a male tool during collation procedures for the hollow composite structure, to which there is good access even when the final composite structure is long and narrow. It is not necessary to do precision work, such as making ply layups, inside a female mold, an important advantage for ease of manufacturing and the health and safety of workers. There are no unnecessary splices, parting lines, or other irregularities in the final part. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
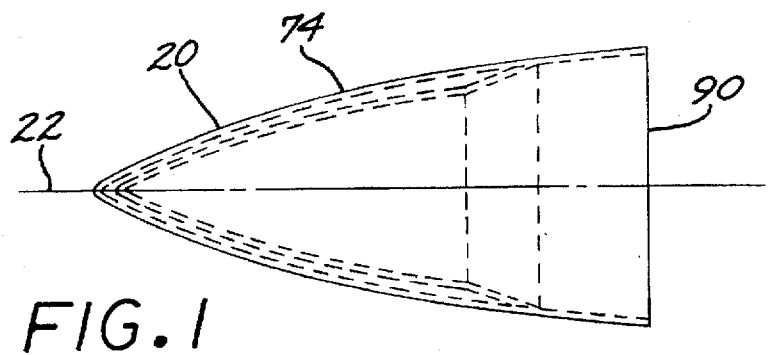
FIG. 1 is a side elevational view of an aircraft nose radome, with interior walls indicated in broken lines.
Figure 2:
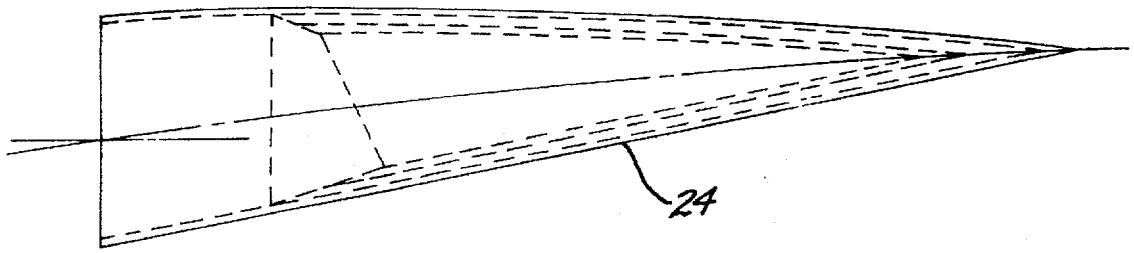
FIG. 2 is a side elevational view of an aircraft tail cone fairing, with interior walls indicated in broken lines.
Figure 3:
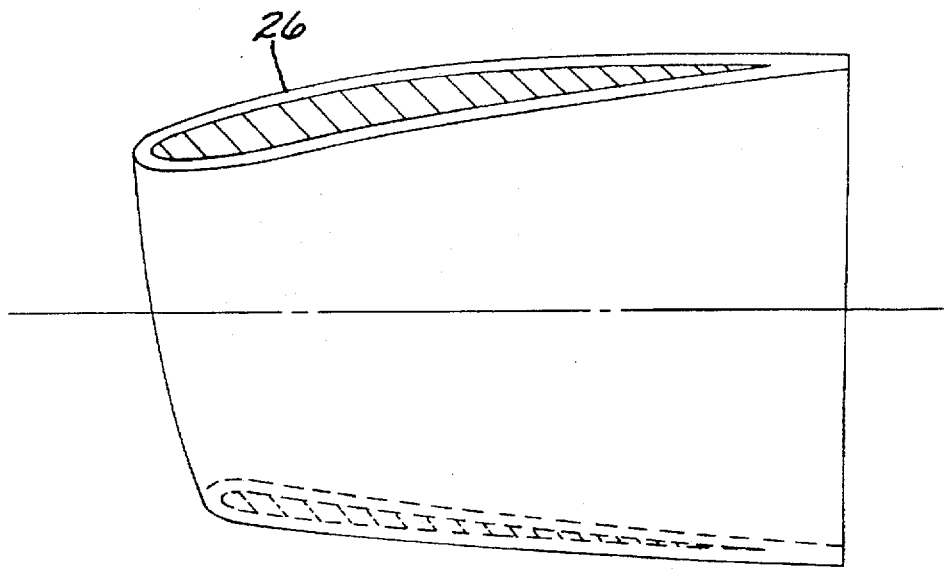
FIG. 3 is a side elevational view of an aircraft engine nacelle, with interior walls indicated in broken lines.

FIGS. 1–3 depict, by way of example, three composite structures that are advantageously manufactured by the approach of the present invention. An aircraft nose radome 20 shown in FIG. 1 is generally ogival (as illustrated) or conical in shape, with an axis of symmetry 22. (In most cases, the radome 20 would not be perfectly symmetric about the axis 22, but could be described as generally symmetric.) The radome 20 is hollow with relatively thin sandwich-panel walls. An aircraft tail cone fairing 24 of similar construction is shown in FIG. 2, and an aircraft engine nacelle 26 of similar construction is shown in FIG. 3. These composite structures present some similar objectives and problems in their fabrication. Ideally, all of these structures would be fabricated as integrated assemblies to fully realize theft potential high strength and low weight. All are relatively large, being at least 5 feet long and several feet in diameter at their widest points. All require that their outer surfaces be smooth and precisely positioned, inasmuch as the outer surfaces form part of the aerodynamic skin of an aircraft. All of the structures have a closed end that is relatively inaccessible due to the size of the part. These parts are fabricated in a custom manner at the present time, with skilled manufacturing workers fabricating each part by hand layup procedures. Consequently, the workers must be able to reach all of the surfaces of the parts, which is not easy due to their closed ends and large size.

Figure 4B:
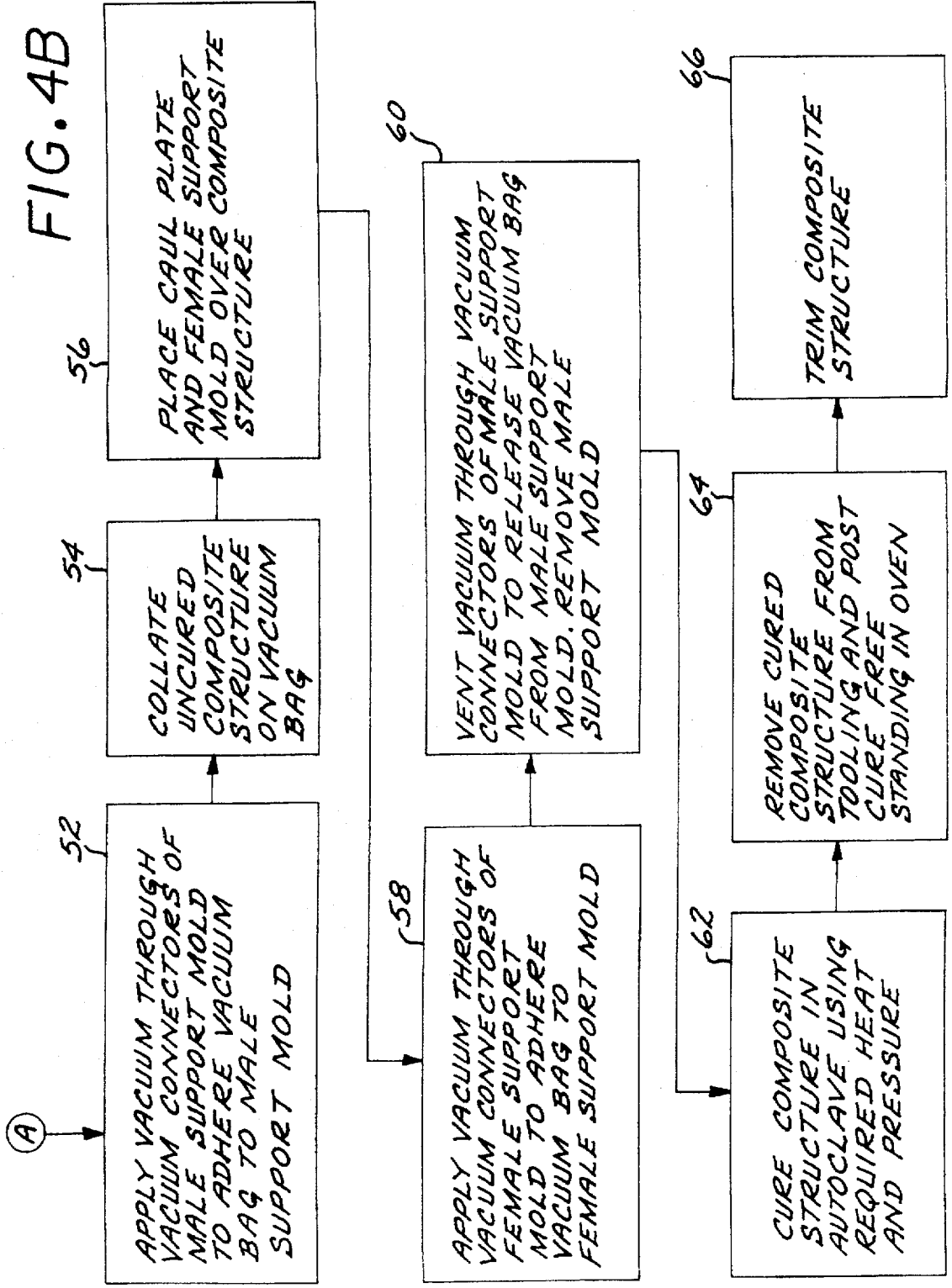
FIG. 4 is a block flow diagram for a preferred approach of practicing the present invention.

FIG. 4 depicts in block diagram form a preferred method for manufacturing such composite structures. FIGS. 5–12 illustrate various stages in the fabrication of a composite structure of the type that is of most interest to the inventor, the aircraft nose radome 20. Briefly, the composite structure is fabricated by starting with a male master model of the final part. A caul plate/female support mold assembly defining the outer surface of the final, cured composite structure is formed by building outwardly from this male master model. A male support mold/vacuum bag assembly defining the inner surface of the uncured composite layup is formed by building inwardly from the caul/plate female support mold assembly. The composite layup is collated on the exterior surface of the male support mold/vacuum bag assembly in the space between the two support mold assemblies, so that the composite structure has accurately defined inner and outer surfaces.

In the fabrication method, a male master model 70 is first provided, numeral 30. The male master model 70 has an exterior surface 72 that defines an outer surface 74 of the composite radome 20. Starting with the male master model 70 to define the outer surface of the finished radome 20 has an important advantage over starting with a female mold form as the master. It is far easier to shape the external surface of a male form than the interior surface of a female form, especially for large, elongated parts with portions to which access is difficult.

A caul plate 76 is placed over the exterior surface 72 of the male master model 70, preferably by custom fabrication, numeral 32. The caul plate 76 is preferably a four-ply laminate of graphite fabric/epoxy prepreg tooling material, and is preferably about 0.040 inch thick. The caul plate 76 is collated and subsequently cured over, and in direct contact with, the exterior surface 72 to faithfully reproduce the exterior surface 72 of the male master model 70. The exterior surface 72 of the male master model 70 is coated with a suitable release agent prior to collation procedures so that the cured caul plate 76 is easily removed from the male master model 70. (As used herein and in the art, "collation", also sometimes called "layup", is the process of arranging the individual components of a composite material onto a form with a specific order and placement.)

Figure 5:
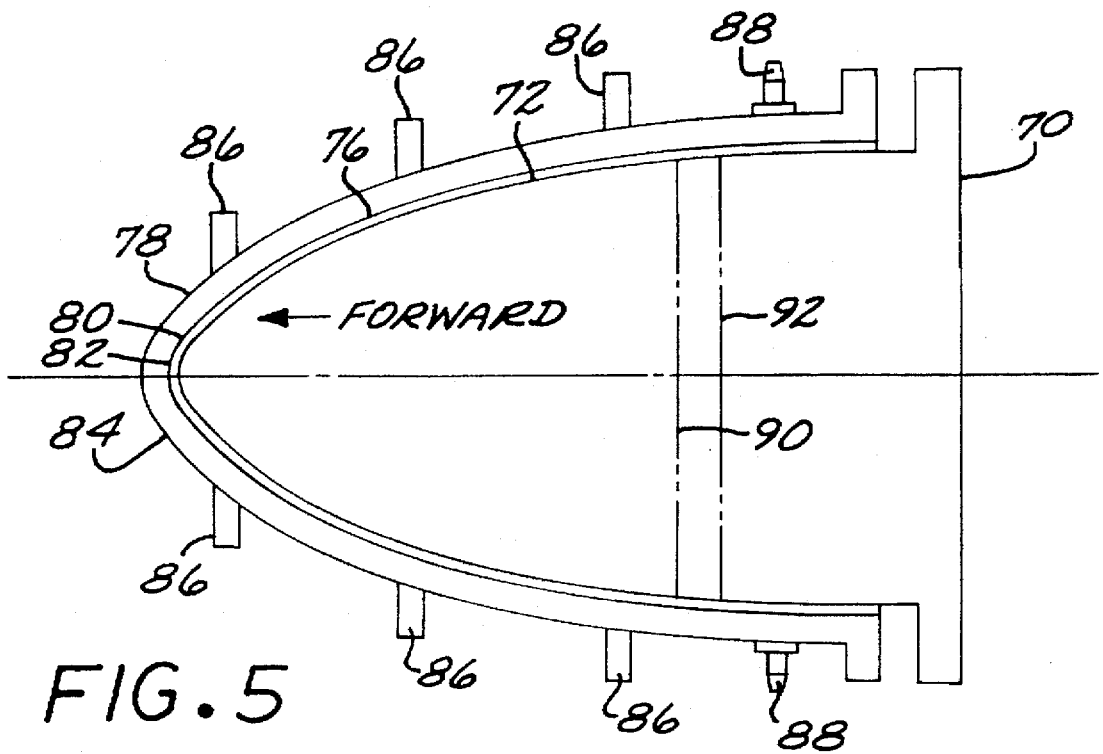
FIG. 5 is a schematic sectional view of the assembly of the male master model, caul plate, and female support mold.

A female support mold 78 is placed over the caul plate 76, preferably by custom fabrication, numeral 34. The female support mold 78 is preferably a ten-ply laminate with selected areas built up to eighteen plies of graphite fabric/epoxy prepreg tooling material, and is preferably from about 0.228 inches to about 0.436 inches thick. The female support mold 78 is collated and subsequently cured over, and in direct contact with, an exterior surface 80 of the caul plate 76 to faithfully reproduce the exterior surface of the caul plate. The exterior surface 80 of the caul plate 76 is coated with a suitable release agent prior to collation procedures so that the cured female support mold 78 is easily removed from the caul plate 76. The caul plate 76 is properly positioned on the male master model 70 during the collation and curing of the female support mold 78. The contact of the interior surface 82 of the female support mold 78 to the caul plate 76 provides rigidity to the caul plate 76 during the cure cycle for the composite structure. Graphite tooling board stiffeners 86 may be bonded to the exterior surface 84 of the female support mold 78 to provide additional rigidity to the female support mold 78. Vacuum connectors 88 are installed in the female support mold 78 at this time. The female support mold 78/caul plate 76 assembly accurately reproduces the shape of the exterior surface 72 of the male master model 70. FIG. 5 depicts the manufacturing assembly at this stage, which completes the fabrication of the tooling that defines the outer surface of the final composite structure. End of part (EOP) composite structure 90 and EOP of the as-fabricated composite structure 92 lines are depicted in FIG. 5 to provide correlation with related features in subsequent figures.

The male master model 70 is removed, numeral 36. Removal is not difficult, inasmuch as the female support mold 78 is not bonded to the caul plate 76, and the caul plate 76 is not bonded to the male master model 70. The male master model 70 is set side for use in fabrication of duplicate tooling as well as to provide a basis for subsequent tool inspection.

Figure 6:
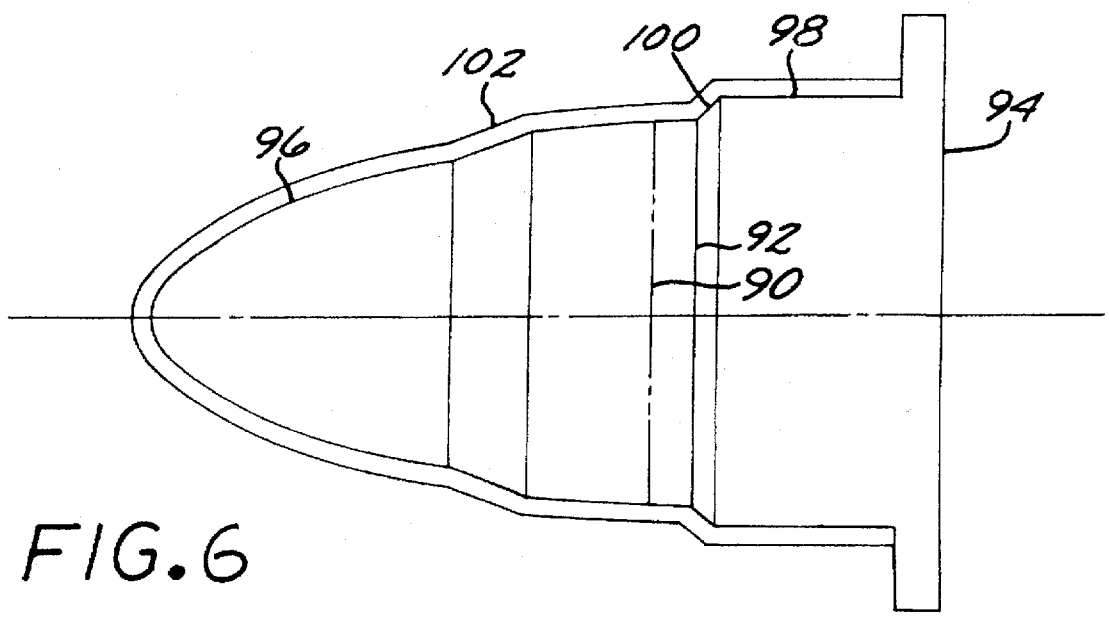
FIG. 6 is a schematic sectional view of the assembly of the male facility tool and the thin caul facility tool.

A male facility tool 94 is fabricated, preferably by custom fabrication, numeral 38. The male facility tool 94 is preferably fabricated of syntactic foam tooling block material exteriorly machined to as complex a shape as necessary for the part being fabricated. For example, in preparing the male facility tool for the F-15 nose radome, the male facility tool 94 has an exterior surface 96 that defines the interior surface of the composite structure, taking into account the thickness of a collated composite structure prior to curing, forward of the EOP as-fabricated composite structure 92. The male facility tool 94 further has an exterior surface 98 that defines the interior surface 82 of the female support mold 78 aft of the EOP as-fabricated composite structure 92, and an exterior surface 100 that defines a 45° transition between the exterior surface 96 and the exterior surface 98. FIG. 6 depicts the manufacturing assembly at this stage, which completes the initial machining sequence for the male facility tool 94.

A thin caul facility tool 102 is fabricated, preferably by custom fabrication, numeral 40. The thin caul facility tool 102 is preferably a four-ply laminate of graphite fabric/epoxy resin prepreg tooling material, and is preferably about 0.040 inches thick. The thin caul facility tool 102 is collated and subsequently cured over, and in direct contact with, the exterior surfaces 96, 98, and 100 to faithfully reproduce these exterior surfaces of the male facility tool 94. The exterior surfaces 96, 98, and 100 of the male facility tool 94 are coated with a suitable release agent prior to collation procedures so that the cured thin caul facility tool 102 is easily removed from the male facility tool 94. FIG. 6 depicts the manufacturing assembly at this stage.

The male facility tool 94 is revised, preferably by custom fabrication, numeral 42. The male facility tool 94 is remachined, to provide an exterior surface to define the interior surface of a vacuum bag, by removing an amount of material in the thickness of the vacuum bag that is subsequently fabricated. About 0.060 inches is typically removed from the exterior surfaces 96, 98, and 100, thereby producing respective new exterior surfaces 104, 106, and 108 on the male facility tool 94.

Figure 7:
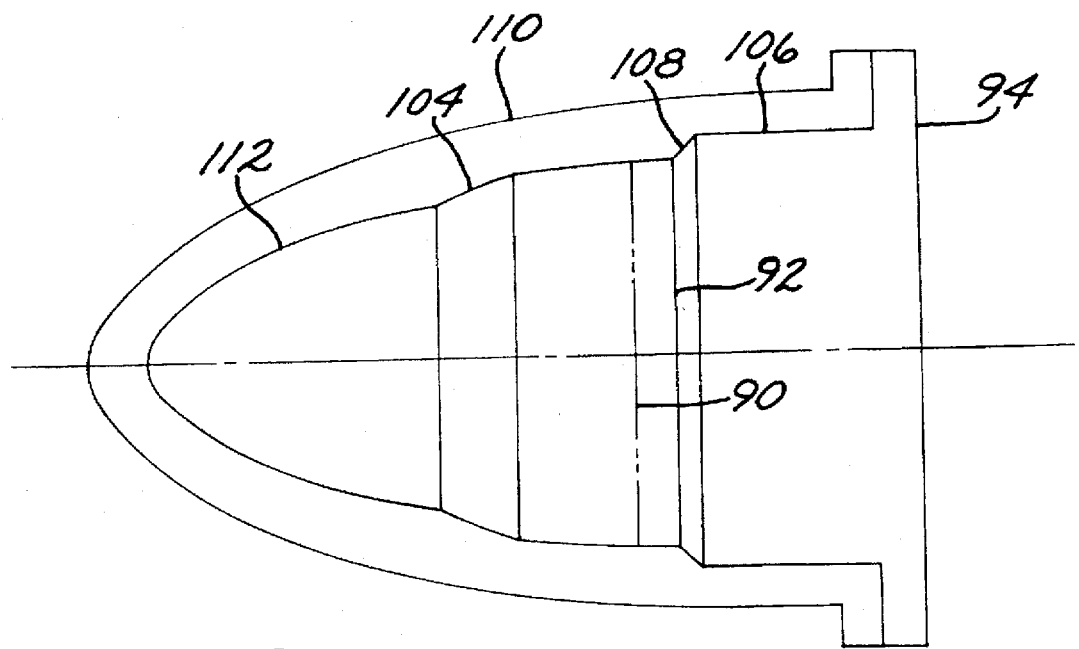
FIG. 7 is a schematic sectional view of the assembly of the remachined male facility tool and the female facility tool.

A female facility tool 110 is fabricated by custom fabrication, numeral 44. The female facility tool 110 is preferably a plastic-faced plaster ("PFP") article. The female facility tool 110 is collated and subsequently cured over and in direct contact with the exterior surfaces 104, 106, and 108 to faithfully reproduce these exterior surfaces of the remachined male facility tool 94. The exterior surfaces 104, 106, and 108 of the remachined male facility tool 94 are coated with a suitable release agent prior to collation procedures so that the cured female facility tool 110 is easily removed from the remachined male facility tool 94. FIG. 7 depicts the manufacturing assembly at this stage, which completes the fabrication of the female facility tool 110.

Figure 8:
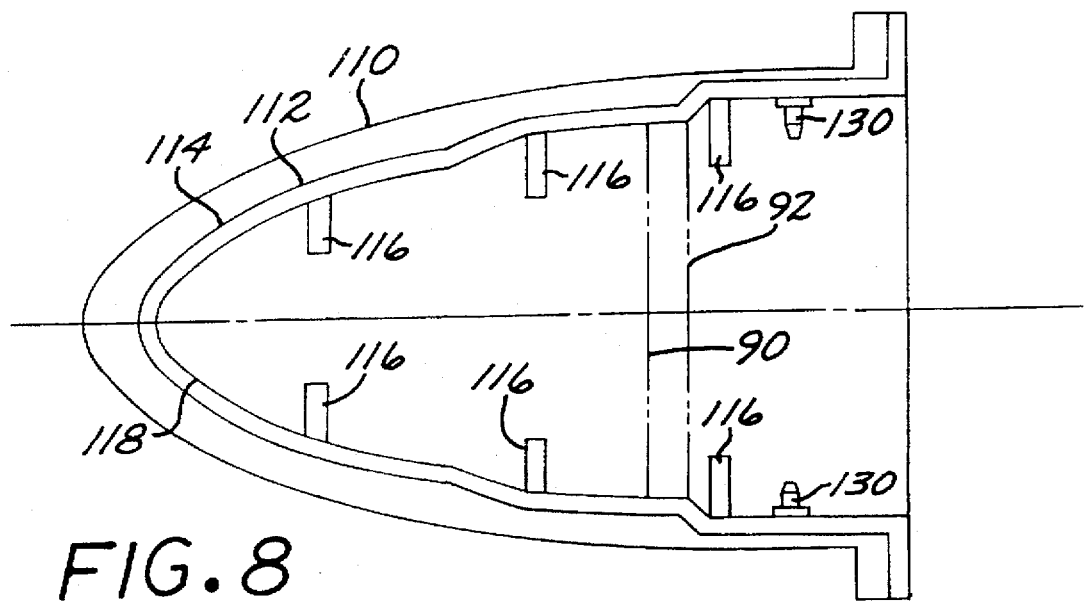
FIG. 8 is a schematic sectional view of the assembly of the female facility tool and the male support mold.

A male support mold 114 is placed into contact with the interior surface 112 of the female facility tool 110, preferably by custom fabrication, numeral 46. The male support mold 114 is preferably a ten-ply laminate, with selected areas built up to eighteen plies, of graphite fabric/epoxy prepreg tooling material, and is preferably from about 0.228 inches to about 0.436 inches thick. The male support mold 114 is collated and subsequently cured over, and in direct contact with, the interior surface 112 to faithfully reproduce the interior surface 112 of the female facility tool 110. The interior surface 112 of the female facility tool 110 is coated with a suitable release agent prior to collation procedures so that the cured male support mold 114 is easily removed from the female facility tool 110. Graphite tooling board stiffeners 116 may be bonded to the interior surface 118 of the male support mold 114 to provide additional rigidity to the male support mold 114. Vacuum connectors 130 are installed in the male support mold 114 at this time. FIG. 8 depicts the manufacturing assembly at this stage, which completes the fabrication of the male support mold 114.

Figure 9:
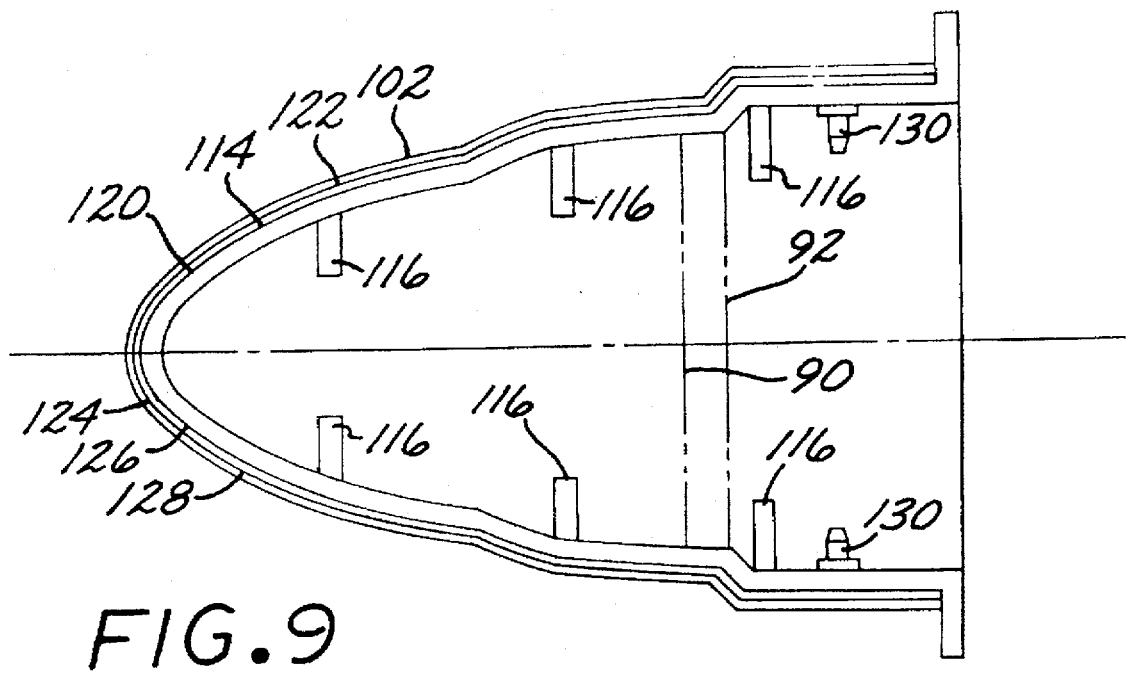
FIG. 9 is a schematic sectional view of the assembly of the thin caul facility tool, vacuum bag, and male support mold.

A vacuum bag 124 is placed into contact with the exterior surface 120 of the male support mold 114 and the interior surface 122 of the thin caul facility tool 102, preferably by custom fabrication, numeral 48. The vacuum bag 124 is preferably a two-ply laminate of uncured silicone rubber sheet stock, and is preferably 0.060 inches thick. The vacuum bag is collated and subsequently cured over, and in direct contact with, the exterior surface 120 to faithfully reproduce the exterior surface 120 of the male support mold 114. The exterior surface of the vacuum bag 124 is in direct contact with the interior surface 122 of the thin caul facility tool 102 during the cure cycle to faithfully reproduce the interior surface 122 of the thin caul facility tool. The exterior surface 120 of the male support mold 114 and the interior surface 122 of the thin caul facility tool 102 are coated with a suitable release agent prior to collation procedures so that the cured vacuum bag 124 is easily removed from the thin caul facility tool 102 and the male support mold 114. The vacuum bag 124 has an interior surface 126 and an exterior surface 128. FIG. 9 depicts the manufacturing assembly at this stage, which completes the fabrication of the vacuum bag 124.

The laminate portion of the female support mold 78, the laminate portion of the male support mold 114, and the vacuum bag 124 can have no leaks therethrough, as they must later support a pressure differential during the debulking and curing procedures for the composite structure.

Figure 10:
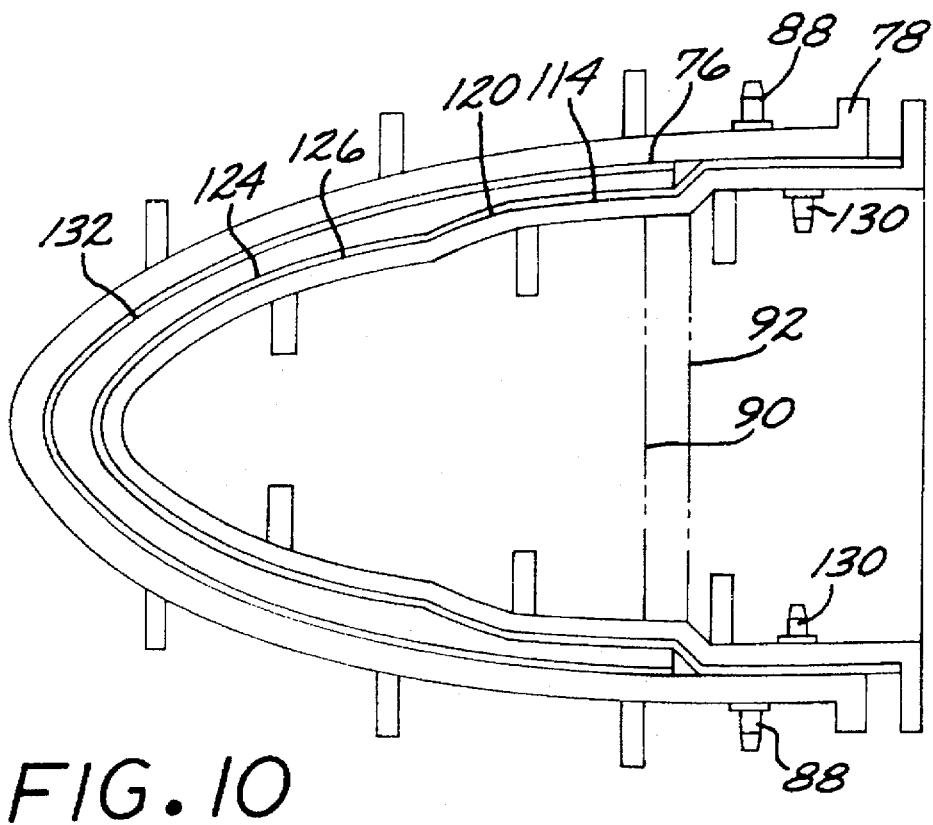
FIG. 10 is a schematic sectional view of the assembly of the male support mold, vacuum bag, composite structure, caul plate, and female support mold.

The interior surface 126 of the vacuum bag 124 is installed over the exterior surface 120 of the male support mold 114, insuring that index lines on the reusable vacuum bag 124 are properly aligned with the corresponding index lines on the male support mold 114, numeral 50. FIG. 10 depicts the configuration of the tooling at this stage.

A vacuum is applied to the vacuum connectors 130 in the male support mold 114 to cause the interior surface 126 of the vacuum bag 124 to adhere to the exterior surface 120 of the male support mold 114, numeral 52. The vacuum between the vacuum bag 124 and the male support mold 114 is established by manually working the vacuum bag from the tip of the tool in the aft direction in a systematic manner until an acceptable vacuum level is attained. Fiberglass breather pads over the face of the vacuum connectors are connected with a thin fiberglass breather strip to facilitate application of the vacuum. To facilitate the manual seating of the vacuum bag, fiberglass breather strips can be applied to the male support mold surface from the tip of the tool aft to connect with the breather pads/breather strip assembly over the vacuum connectors. Fiberglass and porous teflon-coated fiberglass release materials have been used successfully. The vacuum bag 124/male support mold 114 assembly is now ready for the initiation of collation procedures for the composite structure.

Figure 11:
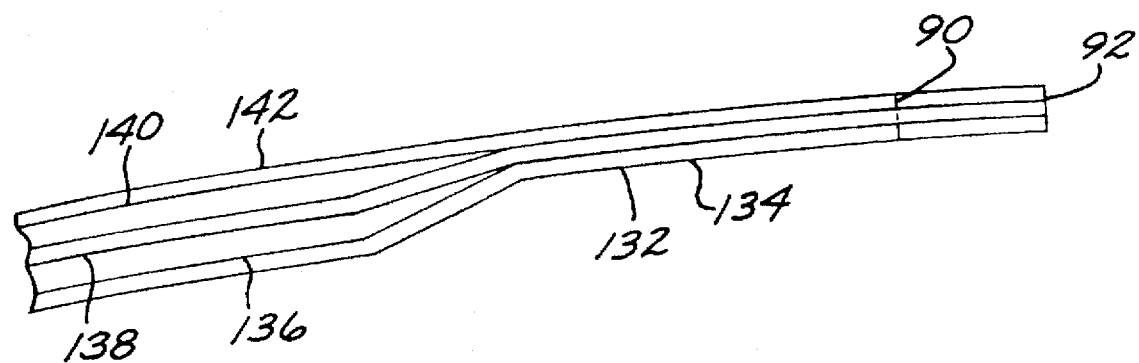
FIG. 11 is a sectional view of one preferred form of the uncured composite structure.

As shown in FIG. 10, an uncured composite structure 132 is collated over the exterior surface 128 of the vacuum bag 124, numeral 54. The uncured composite structure 132 may have any desired form and arrangement that has been determined operable for the construction of the radome 20. FIG. 11 depicts a form of the uncured composite structure 132 that is preferred for use in the radome 20. The uncured composite structure 132 includes an interior surface face sheet 134 constructed of two plies of a fibrous fabric/resin matrix prepreg material positioned adjacent to the exterior surface 128 of the vacuum bag 124. An inner layer of a syntactic foam 136 constructed of an eccosphere/microballoon/resin matrix material formulation of varying thickness is positioned adjacent to the interior surface face sheet 134. An intermediate face sheet 138 constructed of five plies of a fibrous fabric/resin matrix prepreg material is positioned adjacent to the inner layer of syntactic foam 136 and the interior surface face sheet 134. An outer layer of a syntactic foam 140 constructed of an eccosphere/microballoon/resin matrix material formulation of varying thickness is positioned adjacent to the intermediate face sheet 138. An exterior surface face sheet 142 constructed of two plies of a fibrous fabric/resin matrix prepreg material is positioned adjacent to the outer layer of syntactic foam 140 and the intermediate face sheet 138.

Thus, the layer 136 is sandwiched between the face sheets 134 and 138, and the layer 140 is sandwiched between the face sheets 138 and 142 to form a sandwich panel structure depicted at the left-hand side of FIG. 11. The intermediate face sheet 138 is sandwiched between the face sheets 134 and 142 to form a composite laminate structure depicted at the right-hand side of FIG. 11. The transition between the sandwich panel structure and the composite laminate structure is illustrated in the central portion of FIG. 11. Face sheets 134 and 142 provide the interior and exterior surfaces, respectively, of the composite structure 132 that is preferred for use in the radome 20. The invention is not limited to the use of this composite construction, however, and one of its virtues is that it can be used with a wide variety of composite constructions.

The ability to collate the uncured composite structure 132 on the exterior surface 128 of the vacuum bag 124 while the vacuum bag 124 is supported on the male support mold 114, rather than on the inside of the caul plate 76/female support mold 78 assembly, is an important advantage of the present approach. The manufacturing technician who performs the collation procedures is not required to reach inside an elongated, possibly narrow female mold volume to perform the intricate fabrication steps. Instead, the collation is accomplished with full, easy access to the outside surface of the vacuum bag 124/male support mold 114 assembly and each succeeding portion of the composite structure assembly.

The uncured composite structure 132 is collated over the exterior surface 128 of the vacuum bag 124 in a sequence of steps. At selected intervals in the collation procedures the layup is debulked and precompacted directly on the tooling assembly by vacuum bagging the setup in a conventional manner and subjecting the resulting setup to heat and pressure in an autoclave. The temperature and pressure are those recommended for the materials systems used in the composite structure.

After the uncured composite structure 132, including any breather or bleeder plies that may be desired, is collated over the exterior surface 128 of the vacuum bag 124 adhered to the exterior surface 120 of the male support mold 114, the caul plate 76 is installed over the uncured composite layup and the female support mold 78 is installed over the caul plate, numeral 56. Prior to installation of the caul plate 76 over the uncured composite structure 132, the caul plate 76 is trimmed so that its end of part coincides with the EOP as-fabricated composite structure 92. FIG. 10 depicts the manufacturing assembly at this stage, which completes the collation of the composite structure and prepares it for subsequent removal of the male support mold 114 from the assembly.

At this point, support for the uncured composite structure 132 and the vacuum bag 124 is transferred from the male support mold 114 to the caul plate 76/female support mold 78 assembly. The transfer is accomplished by applying a vacuum to the vacuum connectors 88 in the female support mold 78 to adhere the vacuum bag 124 to the female support mold 78, numeral 58. When the vacuum between the vacuum bag 124 and the female support mold 78 is established, the vacuum between the vacuum bag 124 and the male support mold 114 is vented to atmosphere by removal of the vacuum from the vacuum connectors 130 in the male support mold 114. After the vacuum between the vacuum bag 124 and the female support mold 78 is established and atmospheric pressure between the vacuum bag 124 and the male support mold 114 is established, the male support mold 114 is removed, numeral 60. The uncured composite structure 132 is now held in place against the interior surface of the caul plate 76/female support mold 78 assembly by atmospheric pressure against the interior surface 126 of the vacuum bag 124. FIG. 10 depicts the manufacturing assembly prior to the transfer, and FIG. 12 depicts the manufacturing assembly after completion of the transfer procedures.

Figure 12:
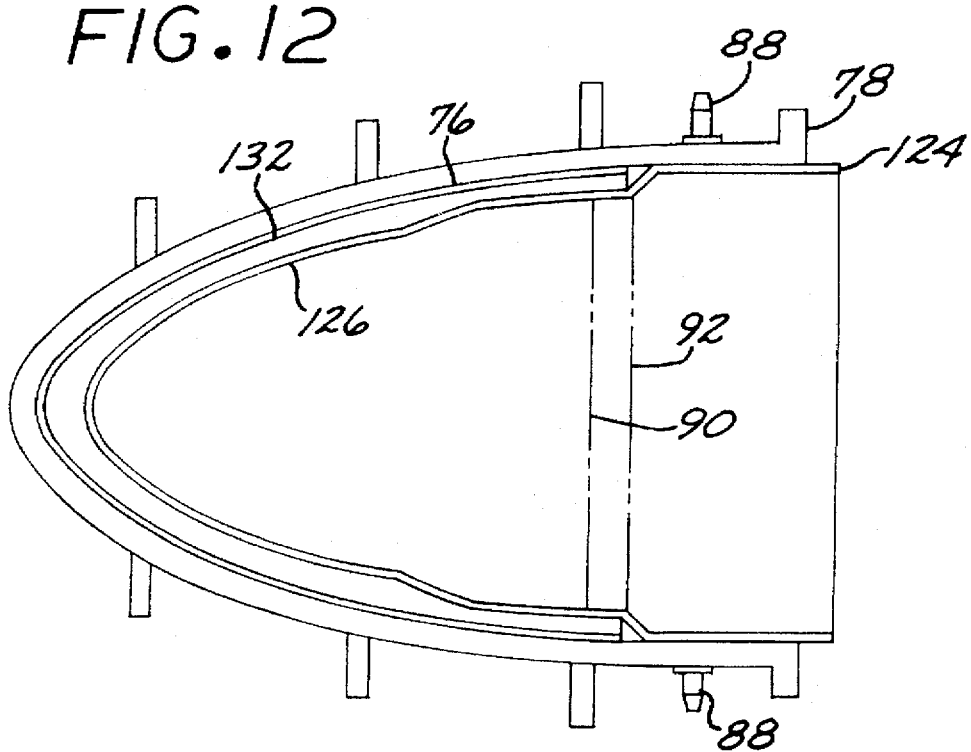
FIG. 12 is a schematic sectional view of the assembly of the vacuum bag, composite structure, caul plate, and female support mold.

The tooling and uncured composite structure assembly depicted in FIG. 12 is subjected to the required heat and pressure to cure the composite layup material, typically in an autoclave device of the type often used for curing composite materials, numeral 62. During curing, either atmospheric pressure, a positive gas pressure, or a combination of the two is applied to the interior surface 126 of the vacuum bag 124 so as to consolidate the composite structure layup material. The temperature, pressure within the vacuum bag, external pressure on the vacuum bag, time at temperature and pressure, and other curing parameters are selected based upon the recommendations of the manufacturers of the constituents of the composite structure 132. These parameters are known in the art for each particular type of constituent of the composite material.

After curing is complete, the assembly depicted in FIG. 12 is removed from the autoclave, and the cured composite structure 132 is separated from the vacuum bag 124, the caul plate 76, and the female support mold 78. Optionally, if specified by the manufacturer of the constituents, the cured composite structure 132 may be post cured, numeral 64. As with the specific curing steps, the specific features of the post-curing step are known in the art.

After curing 62 and post curing 64, if any, the cured composite structure 132 is trimmed, numeral 66, to remove excess material. The composite structure is normally made slightly overly long. It is trimmed along the EOP composite structure 90 to avoid end effects of the fabrication procedure in the final composite structure.

The present invention provides a technique for fabricating a composite structure or multiple substantially identical composite structures from the tooling whose production is described herein. The technique is particularly useful for large structures wherein access to the inner surface is difficult, the outer surface must meet tight dimensional standards and outer mold line tolerances, and the outer surface must be smooth and aerodynamically contoured. Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for fabricating a composite structure having an outer surface and an inner surface, comprising the steps of:

preparing a caul plate/female support mold assembly by the steps of:
   providing a male master model having an exterior surface that defines the outer surface of the composite structure,
   fabricating a caul plate over the exterior surface of the male master model, the caul plate having an interior surface contacting and matching the exterior surface of the male master model,
   fabricating a female support mold over the caul plate, the female support mold having an interior surface contacting an exterior surface of the caul plate, and
   removing the male master model;

preparing a male support mold/vacuum bag assembly having a male support mold and a vacuum bag overlying an external surface of the male support mold, the male support mold/vacuum bag assembly having an exterior surface defining an inner surface of an uncured composite structure, the male support mold/vacuum bag assembly being prepared independently of the caul plate/female support mold assembly;

causing the vacuum bag to adhere to the surface of the male support mold;

collating an uncured composite structure overlying the vacuum bag;

placing the caul plate overlying the uncured composite structure;

placing the female support mold overlying the caul plate;

causing the vacuum bag, uncured composite structure, and caul plate to adhere to the female support mold;

causing the vacuum bag and uncured composite structure to de-adhere from the male support mold; and curing the uncured composite structure in contact with the caul plate with an external pressure applied to the composite structure through the vacuum bag.

2. The method of claim 1, wherein the step of preparing a male support mold/vacuum bag assembly includes the steps of:

fabricating a male facility tool having an exterior surface matching the inner surface of the uncured composite structure, fabricating a thin caul facility tool overlying the exterior surface of the male facility tool, remachining the exterior surface of the male facility tool so that the remachined exterior surface of the male facility tool matches the interior surface of the vacuum bag, fabricating a female facility tool over the remachined exterior surface of the male facility tool, and fabricating the male support mold having its exterior surface matching an interior surface of the female facility tool, and fabricating the vacuum bag over an exterior surface of the male support mold.

3. The method of claim 1, wherein the step of preparing a male support mold/vacuum bag assembly includes the steps of:

placing a dummy composite structure inside the caul plate/female support mold assembly, the dummy composite structure having a shape and thickness that approximates the uncured composite structure, the dummy composite structure having an interior surface;

placing an exterior surface of the vacuum bag in contact with the interior surface of the dummy composite structure, the vacuum bag having an interior surface;

fabricating the male support mold in contact with the interior surface of the vacuum bag, the male support mold and the vacuum bag together comprising the male support mold/vacuum bag assembly, removing the male support mold/vacuum bag assembly and dummy composite structure from the inside of the caul plate/female support mold assembly, and separating the dummy composite structure from the male support mold/vacuum bag assembly.

4. The method of claim 1, wherein the step of providing a male master model includes the step of providing a male master model of a radome.

5. The method of claim 1, wherein the step of providing a male master model includes the step of providing a male master model of a structure selected from the group consisting of a tail cone fairing and an engine nacelle.

6. The method of claim 1, wherein the step of causing the vacuum bag to adhere to the surface of the male support mold includes the steps of:

providing a vacuum connector to the male support mold; and applying a vacuum to the vacuum connector.

7. The method of claim 1, wherein the step of causing the vacuum bag, uncured composite structure, and caul plate to adhere to the female support mold includes the steps of:

providing a vacuum connector to the female support mold; and applying a vacuum to the vacuum connector.

8. The method of claim 6, wherein the step of causing the vacuum bag and uncured composite structure to de-adhere from the male support mold includes the step of removing the vacuum from the vacuum connector of the male support mold.

9. The method of claim 1, wherein the step of curing includes the steps of:

heating the assembly of vacuum bag, uncured composite structure, caul plate, and female support mold to an elevated temperature for a period of time sufficient to form a cured composite structure.

10. The method of claim 1, including an additional step, after the step of curing, of post-curing the cured composite structure.

11. The method of claim 10, wherein the step of post-curing includes the steps of removing the cured composite structure from the assembly of vacuum bag, caul plate, and female support mold; and heating the cured composite structure to an elevated temperature for a period of time sufficient to post-cure the composite structure.

12. The method of claim 1, wherein the step of collating an uncured composite structure includes the steps of forming a first face sheet of composite material overlying the vacuum bag;

forming a layer of a foam material overlying the first face sheet; and forming a second face sheet of composite material overlying the layer of the foam material.

13. The method of claim 1, wherein the step of collating an uncured composite structure includes the step of debulking the uncured composite structure.

14. The method of claim 1, wherein the, step of fabricating a female support mold includes the step of fabricating a one-piece female support mold.

15. A method for fabricating a composite structure having an outer surface and an inner surface, comprising the steps of:

providing a male master model;

fabricating a female support mold structure using the male master model, the female support mold structure having an inner surface;

fabricating a male mold assembly comprising a male support mold and a vacuum bag overlying the male support mold, the male mold assembly having an outer surface, the step of fabricating the male mold assembly including the steps of;

machining a male facility tool having an outer surface and defining the inner surface of the composite structure, except for a thickness of the vacuum bag, preparing the male support mold from the machined male facility tool, and applying the vacuum bag overlying the male support mold;

collating an uncured composite structure overlying the male mold assembly;

placing the female support mold structure overlying the uncured composite structure; and curing the uncured composite between the inner surface and the outer surface.

* * * * *